Figure 1:
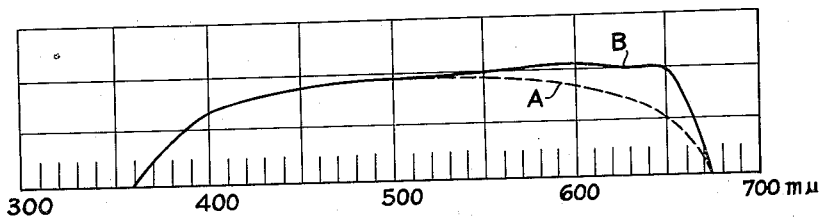

A = 3, 3'- DIETHYL- 9 - METHYLSELENACARBOCYANINE BROMIDE
B = 3, 3'- DIETHYL- 9- METHYLSELENA CARBOCYANINE BROMIDE
      WITH  P- METHOXYACETOPHENONE

C = 3, 3'- DIETHYL- 9- METHYLSELENACARBOCYANINE BROMIDE
D = 3, 3'- DIETHYL- 9- METHYLSELENACARBOCYANINE BROMIDE
      WITH  O- HYDROXYACETOPHENONE

BURT H. CARROLL
JOHN SPENCE
*INVENTORS*

Patented Apr. 17, 1945

2,373,659

UNITED STATES PATENT OFFICE 2,373,659

SENSITIZED PHOTOGRAPHIC EMULSION

Burt H. Carroll and John Spence, Rochester, N. Y., assignors to Eastman Kodak Company, Rochester, N. Y., a corporation of New Jersey Application October 5, 1942, Serial No. 460,788

12 Claims. (Cl. 95—7)

This invention relates to sensitized photographic emulsions and more particularly to spectrally (optically) sensitized emulsions.

It is known that the distribution of spectral sensitivity of certain spectrally sensitized emulsions can be altered and an increase of sensitivity obtained in some spectral region, by incorporating certain additional sensitizing dyes in the spectrally sensitized emulsions. (See United States Patents 2,158,882, dated May 16, 1939, and 2,159,565, dated May 23, 1939.) The effect thus obtained has come to be known as supersensitization. Supersensitization of certain spectrally sensitized emulsions can also be effected by incorporating certain substantially colorless heterocyclic bases in the spectrally sensitized emulsions. (See United States Patent 2,177,635, dated October 31, 1939.) Supersensitization differs from hypersensitization which involves treatment of finished films of plates, an operation which normally reduces the pAg and increases the pH of the emulsions with consequent decreased stability.

We have now found a new method for supersensitizing spectrally sensitized emulsions, which not only does not reduce the stability of the emulsions, but is especially valuable as a means of giving panchromatic sensitized emulsions of high speed and exceptionally good color balance.

It is, accordingly, an object of our invention to provide new supersensitized photographic emulsions. A further object is to provide a process for preparing such emulsions. Still other objects will become apparent hereinafter.

In accordance with the invention, a photographic silver halide emulsion spectrally sensitized with a cyanine or merocyanine dye is supersensitized by incorporating in the emulsion an aromatic ketone selected from those which can be represented by the following general formula:

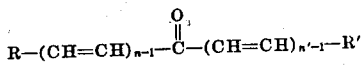

wherein R represents an aryl group which may carry simple substituents, e. g. chlorine atoms, alkoxy groups or hydroxy groups, and R' represents an organic radical, such as an alkyl group, e. g. methyl, chloromethyl, ethyl or benzyl or an aryl group, e. g. phenyl, chlorophenyl, etc., and $n$ and $n'$ each represent a positive integar of from one to two except that $n$ and $n'$ do not both represent two at the same time. Ketones containing strongly electronegative groups, such as CN, $NO_2$ or $SO_3H$ (or its salt forms) are advantageously avoided. Exemplary of the aromatic ketones which are advantageously employed are the following:

Acetophenone
o-Methoxyacetophenone
p-Methoxyacetophenone
p-Methoxybenzophenone
2,5-dimethoxybenzophenone
Anisal acetophenone
Benzal acetone
p-Ethoxyacetophenone.
p-Hydroxybenzalacetone
Benzophenone
o-Hydroxyacetophenone
Acetylacetophenone
Benzoylacetophenone.

The most efficacious of the aromatic ketones are those of the following general formula:

wherein R represents an alkyl group of the formula $C_nH_{2n+1}$ (wherein $n$ represents a positive integer) or an aryl group of the benzene series, R' represents an alkyl group of the formula $C_nH_{2n+1}$ (wherein $n$ represents a positive integer), and the OR' group is in the ortho or para position with respect to the —CO—R group.

Another group of aromatic ketones of high but lesser efficacy than the aforementioned group is that group which can be represented by the following general formula:

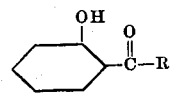

wherein R represents an alkyl group of the formula $C_nH_{2n+1}$ (wherein $n$ represents a positive integer) or an aryl group of the benzene series.

Several strong supersensitizers are among the group of aromatic ketones which can be represented by the following general formula:

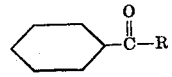

wherein R represents an alkyl group of the formula $C_nH_{2n+1}$ (wherein $n$ represents a positive integer) or an aryl group of the benzene series.

Practically all of the aromatic ketones which supersensitize in accordance with the invention fall within a definite range of solubility in gelatin. For this purpose solubility is defined by the appearance of optical homogeneity in gelatin sheets containing the aromatic ketone. The solubility determination can be carried out as follows: the aromatic ketone dissolved in the minimum amount of methyl or ethyl alcohol or acetone is added to an aqueous gelatin solution (70 g. of gelatin per 1000 cc. of water) and the resulting dispersion is coated on a glass plate. When dry the coated plate is examined for optical homogeneity. The effective aromatic ketones all give practically homogeneous gels in concentrations of from about 7 to about 20 grams of ketone per 100 grams of gelatin. Outside this range of solubility, the efficacy of the aromatic ketones falls off very rapidly.

The majority of cyanine dyes which are supersensitized by the aromatic ketones are characterized by the fact that the dyes produce two types of sensitization depending upon conditions. Such different types of sensitization are described by Leermakers, Carroll and Staud, J. Chem. Physics, 5, 878 (1937) and by G. Schwarz—Sci. et Ind. Phot. 10, 233 (1939). When a cyanine dye of this type is used as a sensitizer in low concentration, it exhibits a sensitizing maximum displaced about 20 to 50 mu toward the red from the absorption maximum in ethyl alcohol solution. On increasing the concentration of the dye, or upon digesting the emulsion containing the dye in the lower concentration, or both, a second maximum of sensitization develops at longer wavelengths, accompanied by an increase in total optical sensitization. In some cases a decrease in sensitivity at the first maximum can be detected. These phenomena are consistent with the hypothesis of two states of the sensitizing dye in an equilibrium which is controlled by concentration. The aromatic ketones favor the formation of a second maximum. The increase in sensitivity apparently corresponds to increased conversion of the dye to the state corresponding to the second maximum of sensitization. In some cases the effect appears to correspond to a more complete conversion than has ever been previously obtained, and in any case the long wavelength sensitivity is better than can be obtained from the same concentration of dye without the aromatic ketone.

The following are exemplary of the cyanine dyes which can be supersensitized in accordance with our invention:

3,3′,9-triethylthiacarbocyanine (iodide)
3,3′-diethyl-9-methylthiacarbocyanine (bromide)
3,3′-diethyl - 9 - methylselenacarbocyanine (bromide)
3,3′-diethyl-9-methyl -4,5,4′,5′ - dibenzthiacarbocyanine (chloride)
3,3′-dimethyl- 9 -ethyl -4,5,4′,5′-dibenzthiacarbocyanine (chloride)
3,3′-diethyl -9- phenyl-4,5,4′,5′-dibenzthiacarbocyanine (chloride)
3,3′,9 - triethyl - 5,5′ - dichlorothiacarbocyanine (bromide)
3,3′-diethyl-9-methyl - 5,5′ - dichlorothiacarbocyanine (bromide)
3,3′-dimethyl-9-ethyl - 5,5′ - dichlorothiacarbocyanine (bromide)
1,1′-diethyl-2,2′-cyanine (iodide)
3,1′-diethyl-4,5-benzthia-2′-cyanine (bromide)
2,1′-diethyl-6′-methoxythia-2′-cyanine (iodide)

The effect of the aromatic ketones is most pronounced with the less soluble merocyanine dyes.

3-Ethyl- 5 -(3-ethyl -2- benzothiazolylidene-isopropylidene) -2- thio-2, 4(3,5)-oxazoledione, 3-ethyl 5-(3-ethyl-2-benzoxazolyidene-ethylidene)-rhodanine and 3- ethyl - 5 - [(3-ethyl-5-methyl-2(3)-1,3,4-thiadiazolylidene) ethylidene] rhodanine are typical merocyanines which respond readily to the action of the aromatic ketones. The effect of the aromatic ketones is especially marked with complex merocyanine dyes, such as are described in the copending application of Leslie G. S. Brooker, Serial No. 316,002, filed January 28, 1940, e. g. merocarbocyanine dyes of the following general formula:

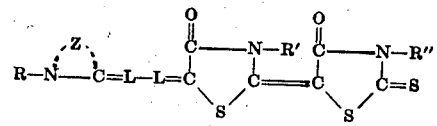

wherein L represents a methine group, R represents a substituted or unsubstituted alkyl group, R and R″ represent alkyl or aryl groups, substituted or unsubstituted, and Z represents the non-metallic atoms necessary to complete a heterocyclic nucleus, such as used in cyanine dyes, e. g. benzothiazole, benzoxazole, β-naphthothiazole, etc.

The sensitizing dyes can be employed in any desired concentration. Ordinarily from 10 to 30 mg. of dye per liter of emulsion will suffice to produce the optimum sensitizing effect. The methods of incorporating sensitizing dyes in emulsions are well known to those skilled in the art. Ordinarily, it is preferable to dissolve the dye in a water-miscible solvent, such as methanol, before incorporating in the emulsion. Ethyl alcohol or acetone may be used when the solubility of the dye in methanol is very low.

The amount of the aromatic ketone used is not critical. Usually the full supersensitizing effect is developed at a concentration of from 1 to 2 grams per liter of emulsion, but amounts up to the point where the ketone separates out on drying the emulsion can be used without bad effects; that may be 10 or more grams per liter of emulsion. The aromatic ketones can be added with, before, or after the sensitizing dye or dyes. The aromatic ketones are preferably, but not necessarily, diluted with a water-miscible solvent, such as methanol, before incorporation in the emulsion.

The following examples will serve to illustrate results obtained in accordance with our invention.

*Example 1*

A fast negative gelatino-silver-bromiodide developing-out emulsion was sensitized with 3,3′-diethyl - 9 - methylselenacarbocyanine bromide (20 mg. per liter of emulsion) and to the spectrally sensitized emulsion was added o-methoxyacetophenone. A portion of spectrally sensitized emulsion was exposed without, and another portion with, the addition of the carbonylic compound, through red (Wratten 25) and minus blue (Wratten 12) filters, the latter giving a good measure of total optical sensitization.

| p-Methoxyacetophenone | Red | | Minus blue | | Fog |
|---|---|---|---|---|---|
| | Speed | Gamma | Speed | Gamma | |
| None | 120 | 1.50 | 630 | 1.49 | .04 |
| 2.5 g./liter | 315 | 1.27 | 830 | 1.36 | .05 |

Example 1a

To a fast negative gelatino-silver-bromiodide developing-out emulsion spectrally sensitized as in Example 1, was added benzal acetone. The emulsion was exposed as in Example 1, with and without the addition.

| Benzal acetone | Red | | Minus blue | | Fog |
|---|---|---|---|---|---|
| | Speed | Gamma | Speed | Gamma | |
| None | 130 | 1.44 | 645 | 1.45 | .11 |
| 2.5 g./liter | 340 | 1.36 | 830 | 1.45 | .08 |

Example 1b

To a fast negative gelatino-silver-bromiodide developing-out emulsion espectrally sensitized as in Example 1, was added o-hydroxyacetophenone. The emulsion was exposed as in Example 1, with and without the addition.

| o-Hydroxyaceto-phenone | Red | | Minus blue | | Fog |
|---|---|---|---|---|---|
| | Speed | Gamma | Speed | Gamma | |
| None | 150 | 1.63 | 740 | 1.61 | .17 |
| 2.5 g./liter | 310 | 1.38 | 725 | 1.45 | .39 |

Example 2

A fast negative gelatino-silver-bromiodide developing-out emulsion was sensitized with 3-ethyl-5 - (2 - ethyl - 1 - benzothiazolylidene-isopropylidene) -2-thio-2,4(3,5) -oxazoledione (15 mg./liter of emulsion), and to the spectrally sensitized emulsion was added p-methoxy acetophenone. A portion of spectrally sensitized emulsion was exposed without and another portion with the addition of the p-methoxyacetophenone, to white light and through a minus blue (Wratten 12) filter.

| p-Methoxyaceto-phenone | Clear | | Minus blue | | Fog |
|---|---|---|---|---|---|
| | Speed | Gamma | Speed | Gamma | |
| 1. None | 910 | 1.26 | 326 | 1.38 | .06 |
| 2. 5 g./liter | 1,100 | 1.27 | 380 | 1.36 | .07 |

Example 3

A slower high contrast gelatino-silver-bromiodide developing-out emulsion was sensitized with 3,3' - diethyl - 9 - methylthiacarbocyanine bromide (20 mg./liter of emulsion), and to the spectrally sensitized emulsion was added p-methoxy acetophenone. The emulsion was exposed as in Example 1.

| p-Methoxyacetophe-none | Red | | Minus blue | | Fog |
|---|---|---|---|---|---|
| | Speed | Gamma | Speed | Gamma | |
| 1. None | 13.8 | 2.15 | 118 | 2.75 | .04 |
| 2. 2.5 g./liter | 32.5 | 2.45 | 162 | 2.54 | .04 |

Example 4

A fast gelatino-silver-bromiodide developing-out emulsion was sensitized with 3,3',9-triethylthiacarboncyanine iodide (20 mg./liter of emulsion), and to the spectrally sensitized emulsion was added p-methoxy acetophenone. The emulsion was exposed with and without the addition of the p-methoxy acetophenone as in Example 1.

| p-Methoxyacetophe-none | Red | | Minus blue | | Fog |
|---|---|---|---|---|---|
| | Speed | Gamma | Speed | Gamma | |
| 1. None | 52.5 | 1.40 | 275 | 1.40 | .05 |
| 2. p-Methoxyaceto-phenone | 87 | 1.23 | 355 | 1.26 | .05 |

Our invention is primarily directed to the customarily employed gelatino-silver-halide developing-out emulsions for development to black-and-white images, such as gelatino-silver-chloride, gelatino - silver - chlorobromide, gelatino-silver-bromide and gelatino-silver-bromiodide developing-out emulsion.

Emulsions prepared in accordance with our invention can be coated in the usual manner upon any desired support such as cellulose nitrate support, cellulose acetate support, polyvinyl acetal resin support, metal support or paper support.

The accompanying drawing further illustrates the supersensitizing effect obtained with two of our new combinations in gelatino-silver-bromiodide emulsions. Each figure of the drawing is a diagrammatic reproduction of two spectrograms. In each figure, the sensitivity of the emulsions containing only the sensitizing dye is represented by the broken-line curve, while the sensitivity of the same emulsion containing the sensitizing dye in combination with an aromatic ketone is represented by the solid-line curve. Inasmuch as the aromatic ketones have little or no sensitizing effect on gelatino-silver-bromiodide emulsions, no spectrogram for the emulsion containing the aromatic ketone alone is shown.

In Figure 1, curve A represents the sensitivity of a fast, negative gelatino-silver-bromiodide developing-out emulsion sensitized with 3,3'-diethyl-9-methyl selenacarbocyanine bromide (in a concentration of 20 mg. per liter of emulsion), and curve B represents the sensitivity of the same gelatino-silver bromiodide emulsion containing 3,3'-diethyl - 9 - methyl selenacarbocyanine bromide (20 mg. per liter of emulsion) plus p-methoxy acetophenone, in a concentration of 2.5 g. per liter of emulsion. The supersensitizing effect of the aromatic ketone is apparent.

Figure 2:
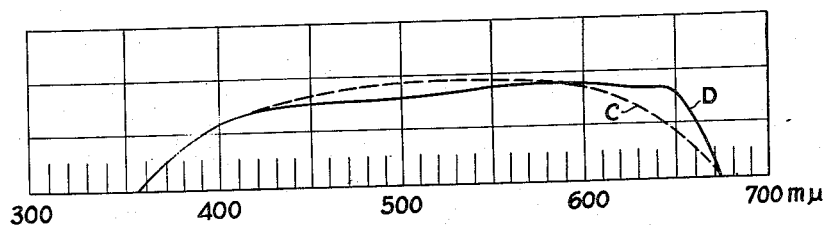

In Figure 2, curve C represents the sensitivity of a fast, negative gelatino-silver-bromiodide emulsion containing 3,3'-diethyl-9-methyl selenacarbocyanine bromide (in a concentration of 20 mg. per liter of emulsion), and curve D represents the sensitivity of the same gelatino-silver-bromiodide emulsion containing 3,3'-diethyl-9-methyl selenacarbocyanine bromide (20 mg. per liter of emulsion) plus o-hydroxy acetophenone, in a concentration of 1.25 g. per liter of emulsion. The supersensitizing effect of the aromatic ketone is apparent.

Merocyanine dyes are described in U. S. Patent 2,078,233, dated April 27, 1937, in U. S. Patent 2,170,803, in U. S. Patent 2,165,338, dated July 11, 1939, in U. S. Patent 2,263,757, dated November 25, 1941, and in the copending application Serial No. 316,002, filed January 27, 1940, of Leslie G. S. Brooker, said copending application describing the more complex dyes.

What we claim as our invention and desire to be secured by Letters Patent of the United States is:

1. A photographic silver halide emulsion spectrally sensitized with a sensitizing dye selected from the group consisting of cyanine and merocyanine dyes, said emulsion containing, as a supersensitizer in a concentration of not more than 10 grams per liter of emulsion, an aromatic ketone selected from those represented by the following general formula:

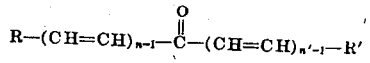

wherein R represents an aryl group, R' represents an organic radical selected from the group consisting of alkyl groups and aryl groups, and $n$ and $n'$ each represent a positive integer of from 1 to 2 except that $n$ and $n'$ do not both represent 2 at the same time.

2. A process for preparing a sensitized photographic silver halide emulsion comprising incorporating in a photographic silver halide emulsion a sensitizing dye selected from the group consisting of cyanine and merocyanine dyes and not more than 10 grams per liter of emulsion of an aromatic ketone selected from those represented by the following general formula:

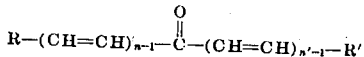

wherein R represents an aryl group, R' represents an organic radical selected from the group consisting of alkyl groups and aryl groups, and $n$ and $n'$ each represent a positive integer of from 1 to 2 except that $n$ and $n'$ do not both represent 2 at the same time.

3. A photographic silver halide emulsion spectrally sensitized with a sensitizing dye selected from the group consisting of cyanine and merocyanine dyes, said emulsion containing, as a supersensitizer in a concentration of not more than 10 grams per liter of emulsion, an aromatic ketone selected from those represented by the following general formula:

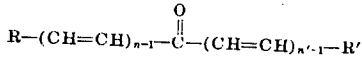

wherein R represents an aryl group of the benzene series, R' represents an organic radical selected from the group consisting of alkyl groups and aryl groups of the benzene series, and $n$ and $n'$ each represent a positive integer of from 1 to 2 except that $n$ and $n'$ do not both represent 2 at the same time.

4. A process for preparing a sensitized photographic silver halide emulsion comprising incorporating in a photographic silver halide emulsion a sensitizing dye selected from the group consisting of cyanine and merocyanine dyes and not more than 10 grams per liter of emulsion of an aromatic ketone selected from those represented by the following general formula:

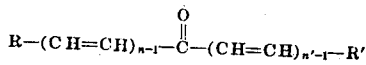

wherein R represents an aryl group of the benzene series, R' represents an organic radical selected from the group consisting of alkyl groups and aryl groups of the benzene series, and $n$ and $n'$ each represent a positive integer of from 1 to 2 except that $n$ and $n'$ do not both represent 2 at the same time.

5. A photographic silver halide emulsion for development to black-and-white images spectrally sensitized with a sensitizing dye selected from the group consisting of cyanine and merocyanine dyes, said emulsion containing, as a supersensitizer in a concentration of not more than 10 grams per liter of emulsion, an aromatic ketone selected from those represented by the following general formula:

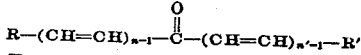

wherein R represents an aryl group of the benzene series, R' represents an organic radical selected from the group consisting of alkyl groups and aryl groups of the benzene series, and $n$ and $n'$ each represent a positive integer of from 1 to 2 except that $n$ and $n'$ do not both represent 2 at the same time.

6. A process for preparing a supersensitized photographic silver halide of the type employed for development to black-and-white images comprising incorporating in the emulsion a sensitizing dye selected from the group consisting of cyanine and merocyanine dyes and not more than 10 grams per liter of emulsion of an aromatic ketone selected from those represented by the following general formula:

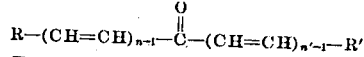

wherein R represents an aryl group of the benzene series, R' represents an organic radical selected from the group consisting of alkyl groups and aryl groups of the benzene series, and $n$ and $n'$ each represent a positive integer of from 1 to 2 except that $n$ and $n'$ do not both represent 2 at the same time.

7. A photographic silver halide emulsion for development to black-and-white images spectrally sensitized with a cyanine dye which produces maximum sensitivity in the emulsion at one concentration and at a higher concentration, or upon digestion of the emulsion containing the dye at the lower concentration, produces a second maximum at a wavelength longer than that of the first maximum, said emulsion containing, as a supersensitizer in a concentration of not more than 10 grams per liter of emulsion, an aromatic ketone selected from those which are represented by the following general formula:

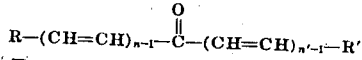

wherein R represents an aryl group of the benzene series, R' represents an organic radical selected from the group consisting of alkyl groups and aryl groups of the benzene series, and $n$ and $n'$ each represent a positive integer of from 1 to 2 except that $n$ and $n'$ do not both represent 2 at the same time.

8. A photographic gelatino-silver-halide emulsion for development to black-and-white images spectrally sensitized with a cyanine dye which produces maximum sensitivity in the emulsion at one concentration and at a higher concentration, or upon digestion of the emulsion containing the dye at the lower concentration, produces a second maximum at a wavelength longer than that of the first maximum, said emulsion containing, as a supersensitizer in a concentration of not more than 10 grams per liter of emulsion, an aromatic ketone selected from those which are represented by the following general formula:

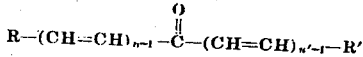

wherein R represents an aryl group of the benzene series, R' represents an organic radical selected from the group consisting of alkyl groups and aryl groups of the benzene series, and $n$ and $n'$ each represent a positive integer of from 1 to

Certificate of Correction

Patent No. 2,373,659.                                     April 17, 1945.

BURT H. CARROLL ET AL.

It is hereby certified that errors appear in the printed specification of the above numbered patent requiring correction as follows: Page 1, second column, lines 19 to 23, strike out the formula and insert instead

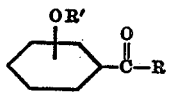

page 2, first column, line 62, before "3,3'-diethyl" insert *3,3',9-triethyl-4,5,4',5'-dibenzthiacarbocyanine (chloride)*; and that the said Letters Patent should be read with these corrections therein that the same may conform to the record of the case in the Patent Office.

Signed and sealed this 16th day of October, A. D. 1945.

[SEAL]

LESLIE FRAZER,
*First Assistant Commissioner of Patents.*

Certificate of Correction

Patent No. 2,373,659.  April 17, 1945.

BURT H. CARROLL ET AL.

It is hereby certified that errors appear in the printed specification of the above numbered patent requiring correction as follows: Page 1, second column, lines 19 to 23, strike out the formula and insert instead

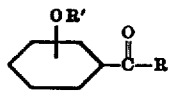

page 2, first column, line 62, before "3,3'-diethyl" insert *3,3',9-triethyl-4,5,4',5'-dibenzthiacarbocyanine (chloride)*; and that the said Letters Patent should be read with these corrections therein that the same may conform to the record of the case in the Patent Office.

Signed and sealed this 16th day of October, A. D. 1945.

[SEAL]

LESLIE FRAZER,
*First Assistant Commissioner of Patents.*